United States Patent [19]

Magorien

[11] 4,447,040
[45] May 8, 1984

[54] FLUID LINE COUPLING WITH RELIEF VALVE

[75] Inventor: Vincent G. Magorien, Granada Hills, Calif.

[73] Assignee: Systron-Donner, Concord, Calif.

[21] Appl. No.: 486,695

[22] Filed: Apr. 20, 1983

[51] Int. Cl.³ .................... F16L 37/28; F16K 31/12
[52] U.S. Cl. .................. 251/149.8; 137/508; 137/613; 137/614.03
[58] Field of Search ............ 137/614.03, 614.04, 137/614.05, 508; 251/149.6, 149.8

[56] References Cited

U.S. PATENT DOCUMENTS

| | | | |
|---|---|---|---|
| 3,073,342 | 1/1963 | Magorien | 251/149.6 |
| 3,334,659 | 8/1967 | Magorien | 251/149.6 |
| 3,993,361 | 11/1976 | Stelzer | 137/508 |
| 4,287,914 | 9/1981 | Buseth et al. | 137/614.03 |
| 4,327,770 | 5/1982 | Brown et al. | 137/614.05 |

Primary Examiner—A. Michael Chambers
Attorney, Agent, or Firm—Fulwider, Patton, Rieber, Lee & Utecht

[57] ABSTRACT

A fluid coupling component having a valve that functions in a conventional manner when the component is connected to a mating component, but functions as a pressure relief valve when the component is in a disconnected condition. The coupling component includes a poppet and a valve, both mounted for sliding movement within a housing, and urged into engagement by a valve spring, when in the disconnected condition. A shoulder inside the housing limits movement of the poppet in a direction out of the housing, and allows sufficient internal fluid pressure to move the valve out of engagement with the poppet.

7 Claims, 4 Drawing Figures

FLUID LINE COUPLING WITH RELIEF VALVE

BACKGROUND OF THE INVENTION

This invention relates generally to fluid line coupling devices, and more particularly, to fluid line coupling devices used to connect and disconnect relacement modules in hydraulic and other fluid systems. To facilitate maintenance of a fluid system, it is often desirable to design the system to include one or more replaceable modules, which can be conveniently removed and replaced without having to drain fluid from the system, and without having to refill the system and flush it to remove trapped air.

A fluid system designed to include replaceable modules requires a special type of fluid coupling device having two essential properties. First, little or no air must be introduced into the fluid system during connection of the coupling, and second, there must be little or no spillage of fluid during connection or disconnection. Couplings of this general type have been available for some years, as disclosed, for example, in U.S. Pat. Nos. 3,073,342, entitled "Airless Coupling," and 3,334,659, entitled "Flow Stream Immersed Supporting Structure", both invented by Vincent G. Magorien.

Although fluid couplings providing negligble fluid loss are desirable in many applications, there is an inherent disadvantage to the use of these couplings. Fluid modules that can be connected and disconnected with practically no volume change constitute a relatively "stiff" system from a fluid mechanics standpoint. Some form of pressure relief has to be provided to compensate for fluid volume changes caused by increases in temperature, for example. The relief may be provided by a reservoir somewhere in the system, or by a thermally actuated pressure relief valve. Since a reservoir is more costly to provide than a relief valve, most systems include a reservoir only in the principal module of the system, and include relief valves in the removable modules. However, when a module with a relief valve is coupled to a principal module with an expansion reservoir, the relief valve becomes redundant. Another drawback is that a relief valve may occasionally open in the coupled condition, and lead operators of the system to conclude that there is an unwanted leak in the system.

Accordingly, it will be apparent that there has been a significant need for a coupling component that functions as a relief valve when in the disconnected condition, but functions as a conventional coupling component when in the connected condition. Ideally, such a coupling component should employ substantially the same parts as a conventional coupling component without the relief valve feature, so that manufacturing costs would not be significantly affected. The present invention is directed to these ends.

SUMMARY OF THE INVENTION

The present invention resides in a fluid coupling component that performs a relief valve function, but not in the connected condition of the coupling. Basically, and in general terms, the coupling component of the invention includes a tubular housing having one end in fluid communication with a fluid system module and an operative end portion for connection to a mating coupling component. The principal parts of the coupling component are a valve disposed centrally and movable axially in the housing, and a poppet also movable axially in the housing, and having an annular portion engageable with the valve to provide a valve closure at the operative end of the housing. In addition, there is a valve spring operative to urge the poppet into sealing engagement with the valve, and abutment means rigidly connected to the housing, to limit movement of the poppet toward the operative end of the housing. A second spring is operative to urge the poppet, and with it the valve, into engagement with the abutment means when in the disconnected condition of the coupling.

In the disconnected condition of the coupling, excessive fluid pressure will move the valve out of sealing engagement with the poppet, which is prevented from further movement by the abutment means. During connection with a mating coupling component, the poppet is moved further into the housing. Since the second spring is weaker than the valve spring, the second spring is compressed first and the poppet and valve initially move together into the housing. When the valve reaches the limit of its travel, the valve spring is then compressed and the poppet separates from the valve and establishes fluid communication across the coupling. Thus, during connection of the coupling and in the connected condition, the coupling component of the invention functions exactly the same as a similar component of the prior art.

More specifically, the poppet takes the form of a hollow piston having a cental opening, around which there is a conical valve seat with an annular seal. The poppet is sealingly engaged with the inner surface of the housing and can be moved axially. Engagement of an annular shoulder on the piston with a corresponding shoulder on the housing, limits axial movement of the poppet toward the operative end of the housing. The valve includes a portion with a conical surface for engagement with the valve seat of the poppet, and a valve stem extending back into the housing. The stem is connected to an annular support structure that is also slidably engaged in the housing. The valve spring is disposed about the valve stem and bears at one end on this annular support stucture and at the other end on the poppet, thereby urging the valve and poppet into sealing engagement. The combined valve structure, poppet and valve spring are axially movable together within the housing.

Completing the coupling component is the second spring, which is another another compression spring, engaging the annular structure of the valve at one end, on the opposite side from the valve spring, and engaging another annular shoulder in the housing at the other end of the spring. Thus, the second spring urges the poppet and valve together toward the operative end of the housing and into engagement with the annular shoulder forming the abutment means.

It will be appreciated from the foregoing that the present invention represents a significant advance in the field of fluid coupling devices. In particular, the invention provides a fluid coupling component that functions as a relief valve when in the disconnected condition, but not when in the connected condition. Other aspects and advantages of the invention will become apparent from the following more detailed description, taken in conjunction with the accompanying drawings.

DESCRIPTION OF THE PREFERRED EMBODIMENT

Figure 1:
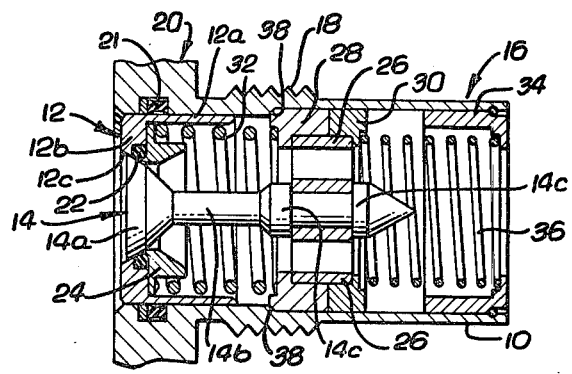
FIG. 1 is a longitudinal sectional view of the female half of a fluid connector of the prior art.

As shown in the drawings for purposes of illustration, the present invention is principally concerned with fluid coupling devices of the type that, during connection or disconnection, introduce little or no air and spill little or no fluid. In many instances, a pressure relief valve provided in a module of a fluid system becomes redundant when the module is connected to another module having a reservoir that serves to relieve excessive pressure.

In accordance with the invention, a coupling component serving as one half of a fluid coupling includes a relief valve that is operative in the disconnected condition but not in the connected condition. Thus the coupling component relieves excess pressure when the module of which it is a part is not connected to a fluid reservoir. But when the module is connected through the coupling to another module, the relief valve is inoperative and a potential source of fluid leaks is eliminated.

FIG. 1 shows the female component of a fluid connector of the prior art. The component includes a tubular housing, indicated by reference numeral 10, a poppet 12 and a valve 14. The housing 10 has one end portion 16 in fluid communication with a module of a fluid system of some kind, and is shown as being securably attachable to the module by means of male threads 18 on the housing. The other end portion 20 of the housing 10, which will be referred to as the operative end, is connectable to a corresponding male coupling component, like the one shown in FIG. 4.

The poppet 12 is basically a hollow piston, having a cylindrical portion 12a fitted for sliding movement in the housing, and an integral end portion 12b with a central opening 12c. An annular seal 21 prevents fluid loss around the cylindrical portion 12a of the poppet. The edge of the opening 12c forms a conical surface presenting a larger diameter in a direction away from the housing 10. An O-ring seal 22 is disposed in an annular recess in the opening 12c, and a seal retaining ring 24 is positioned against the inner surface of the end portion 12b, to hold the seal 22 in place.

The valve 14 includes a conical portion 14a designed to seat on the seal 22, an integral valve stem 14b exending back into the housing along the central axis, and a pair of flanges 14c on an end portion of the stem. Disposed about the valve stem 14b, between the flanges 14c, are a number of tubes 26 with their axes parallel with that of the housing. A bearing washer 28 and an annular tube retainer 30 surround the tubes 26 and are fitted for sliding movement inside the housing 10. The washer 28 has an annular shoulder that engages one end of the tubes 26, and the tube retainer has an annular shoulder that performs a similar function at the other end of the tubes. The tubes 26, washer 28 and tube retainer 30 together form a slideable supporting structure for the valve 14.

Surrounding the valve stem 14a is a valve spring 32 compressed between the bearing washer 28 and the seal retaining ring 24. The valve spring 32 therefore urges the valve assembly, including the valve 14, tubes 26, washer 28 and tube retainer 30, toward the right as viewed in the drawings, and urges the poppet 12 to the left, thereby keeping the valve and the poppet engaged at the seal 22. It is important to note, however, that the valve 12 and poppet 14 can still move together within the housing when the valve and poppet are sealingly engaged. This movable combination is referred to as a cartridge, since it not only can move as one assembly, but may also be removed as a single unit.

Only two additional parts of the prior-art coupling component remain to be identified. An insert sleeve 34 is secured in the right-hand end portion of the housing, as viewed in the drawings, and a cartridge spring 36 is diposed between a shoulder on the sleeve 34 and another shoulder on the tube retaining ring 30. The cartridge spring 36 serves to hold the tube retainer 30 in position, and urges the cartridge, including the valve 14, poppet 12, valve spring 32, seal 22 and seal retaining ring 24, toward the operative end 20 of the housing. The only structure limiting movement of the assembled cartridge is a sloping annular shoulder on the inner surface of the housing 10. This shoulder engages a chamfered cdge of the bearing washer 28, as illustrated in FIG. 1.

When the female coupling component of FIG. 1 is connected to a mating component, similar to the one shown on the left-hand side of FIG. 4, the valve 14 and poppet 12 operate in the following manner. Since the valve spring 32 is selected and preloaded to provide a higher compressive force than that of the cartridge spring 36, a coupling force applied to the poppet 12 does not initially unseat the poppet from the valve 14. Instead, both the valve 14 and poppet 12 are moved together, compressing the cartridge spring 36 until the tube retainer 30 "bottoms out" on the insert sleeve 34. Further movement of the poppet 12 opens the valve 14 and places the fluid within the housing 10 in communication with the mating coupling component. Action of the male component during this coupling operation will be explained in relation to FIG. 4, but is not considered critical to the invention.

It is important to observe in FIG. 1 that, in the disconnected condition, the valve 14 cannot be unseated by internal fluid pressure, since the poppet 12 is not in any way constrained from axial movement, and will be held in engagement with the valve. Excess pressure within the coupling component of FIG. 1 is effective only to increase the force between the sloping shoulder 38 and the bearing washer 28. However, once the washer 28 is moved away from the shoulder 38, during a couplinq operation, the pressure within the housing could be high enough to unseat the valve 14 before the coupling operation is complete. Usually, the valve spring is made strong enough to avoid this possibilty.

In couplings of the type shown in FIG. 1, if pressure relief is desired it has to be provided by means of a conventional pressure relief valve (not shown). The principal disadvantage of this arrangement is that the relief valve becomes redundant when coupled to a module that already provides for pressure relief, by inclusion of a fluid reservoir, for example.

Figure 2:
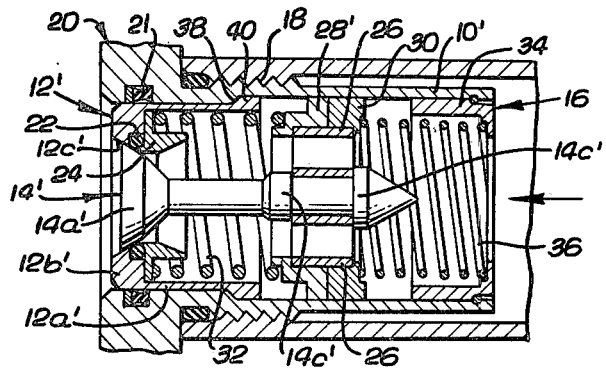
FIG. 2 is a longitudinal sectional view similar to FIG. 1, but modified in accordance with invention to provide a relief valve feature.

In the coupling component of the invention, as shown in FIG. 2, most of the parts are identical to corresponding ones in FIG. 1, and the same reference numerals have been used to identify corresponding parts. There are, however, two important differences between the two components. First, the poppet in FIG. 2, referred to by reference numeral 12', is constructed to include an external annular shoulder 40, which engages a corresponding shoulder 38' on the inside surface of the housing 10' thereby limits movement of the poppet in a direction out of the housing. The second and related difference is that the housing 10' no longer includes the sloping shoulder 38 in the position shown in FIG. 1, and the washer, now referred to by 28', is therefore free to move axially in the disconnected condition of the coupling.

Figure 3:
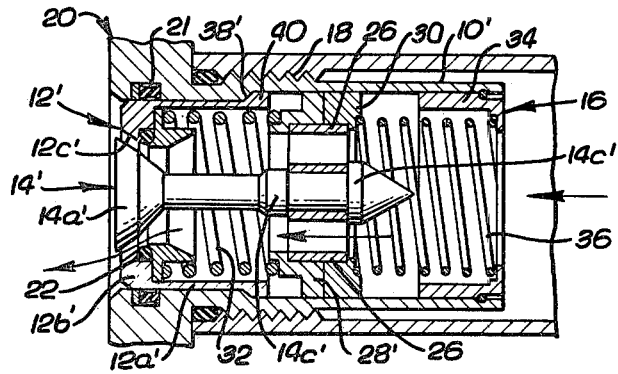
FIG. 3 is a view similar to FIG. 2, but showing the relief valve in operation.

When the coupling is in the disconnected condition, as shown in FIG. 2, the valve 14' and the poppet 12' will be held in sealing engagement by the force of the valve spring 32. The opposing forces, tending to unseat the valve 14', are the force of the cartridge spring 34, and the internal fluid pressure force acting across the area of the valve bounded by the O-ring seal 22. The valve will "crack" slightly when the fluid pressure force just exceeds the difference between the forces of the two springs 32 an 36. FIG. 3 shows the coupling component with the valve open to vent excess pressure. In practice, the valve may open only a few thousandths of an inch at most.

Figure 4:
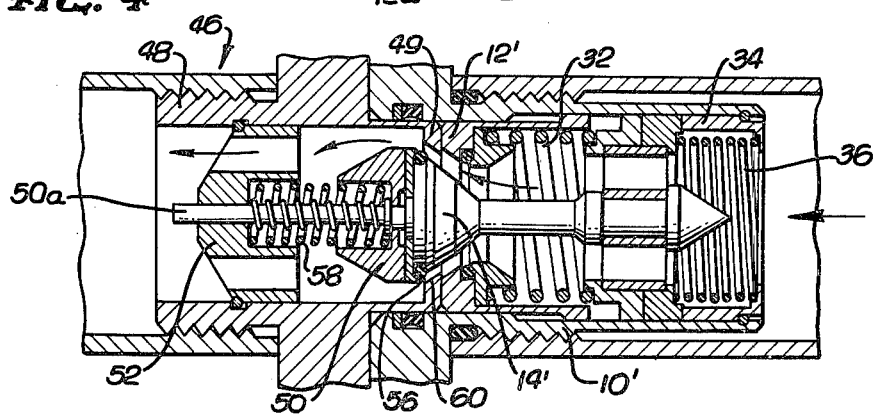
FIG. 4 is a view similar to FIG. 2, but showing the female half connected to the male half of the fluid coupling.

When in the connected condition, shown in FIG. 4, the coupling of the invention functions in the same manner as the prior-art coupling of FIG. 1. A male coupling component 46 includes a generally tubular housing 48 having an end wall 49 with a central opening through it, and a valve member 50, having a stem 50a mounted for axial sliding movement in a supporting structure 52 within the housing. The valve member 50 also incudes an O-ring seal 56 retained in an annular groove at the operative end of the valve member. A valve spring 58 urges the valve member 50 into engagement with a conical valve seat 60 in the opening 49 when the coupling is in the disconnected condition (not shown for the male component).

During a coupling operation, the male housing 48 is inserted into the female housing 10, the end wall 49 of the male housing contacting the end wall 12b of the poppet 12, and the valve member 50 contacting the valve 14. Initially, the valve springs 32 and 58 keep the valves on both sides of the coupling seated, and the poppet 12, valve 14 and valve member 50 are moved together to the right, as viewed in the drawings, against the weaker force of the cartridge spring 36. When the tube retainer 30 engages the insert sleeve 34, further coupling movement unseats both valves 14 and 50, and leaves the coupling in the position shown in FIG. 4. The coupling then has to be latched in this position by some conventional means (not shown), such as locking screws.

It will be appreciated from the foregoing that the present invention represents a significant advance in the field of fluid coupling devices. In particular, the invention provides a female coupling component that functions as a pressure relief valve when in the disconnected condition, but functions as a normal coupling component when connected to its mating component. It will also be appreciated that, although a specific embodiment of the invention has been described in detail for purposes of illustration, various modifications may be made without departing from the spirit and scope of the invention. Accordingly, the invention is not to be limited exeept as by the appended claims.

I claim:

1. A fluid coupling component, comprising:
   a tubular housing having one end in fluid communication with a fluid system module and an operative end portion for connection to a mating coupling component;
   a valve disposed centrally in said housing and movable axially in said housing;
   a poppet also movable axially in said housing and having an annular portion engageable with said valve to provide a valve closure;
   a valve spring operative to urge said poppet into sealing engagement with said valve;
   non-resilient abutment means rigidly connected with said housing, for limiting movement of said poppet toward the operative end of said housing;
   a second spring operative to urge said poppet, and with it said valve, into engagement with said abutment means when in the disconnected condition of the coupling;
   whereby, in the disconnected condition, excessive fluid pressure in the component will move said valve out of sealing engagement with said poppet, which is prevented from further movement by said abutment means.

2. A fluid coupling component as set forth in claim 1, wherein:
   said annular portion of said poppet includes a conical surface and a seal forming a valve seat; and
   said valve includes a conical surface for engagement with the valve seat, a central valve stem, and a supporting structure affixed to said stem and fitted for sliding movement in said housing.

3. A fluid coupling component as set forth in claim 2, wherein:
   said valve spring is disposed between said supporting structure of said valve and said annular portion of said poppet, to urge said conical surface of said valve into engagement with said seal.

4. A fluid coupling component as set forth in claim 3, wherein:
   said second spring is disposed between said supporting structure of said valve and a shoulder attached to said housing.

5. A fluid coupling component as set forth in claim 3, wherein said supporting structure includes:
   a pair of flanges on said valve stem;
   a plurality of parallel tubes disposed about said valve stem and between said flanges;
   annular retaining means encircling said tubes and sized to slideably engage said housing.

6. A fluid coupling component for connection to a mating component with little or no fluid loss or introduction of air, said component providing pressure relief in the disconnected condition, and comprising:
   a tubular body having one end for communication with a fluid module and an operative end connectable to a mating component;
   a piston-like poppet mounted for sliding movement within said housing near the operative end, said poppet having a cylindrical portion and an integral end wall with a central opening through it;
   a conical valve seat formed in said opening and including an O-ring seal;
   a valve having a conical end portion sized to engage said valve seat, a centrally disposed valve stem, and a supporting structure attached to said valve stem and fitted into said housing for sliding movement;

a valve spring disposed about said valve stem and bearing on said valve supporting structure at one end and said poppet at the other end;

a second compression spring disposed between said supporting structure and a shoulder in said housing, to urge said valve in a direction out of said housing;

an external annular shoulder on said poppet; and a corresponding annular shoulder on said housing, to abut said shoulder on said poppet in a non-resilient manner and thereby limit movement of said poppet in a direction out of said housing, whereby a sufficiently high pressure applied to said valve from within said housing, in the disconnected condition, will lift said valve from said valve seat to relieve the pressure.

7. A fluid coupling component as set forth in claim 6, wherein said supporting structure includes:

a pair of flanges on said valve stem;

a plurality of parallel tubes disposed about said valve stem and between said flanges;

annular retaining means encircling said tubes and sized to slideably engage said housing.

* * * * *